(12) United States Patent
Linke et al.

(10) Patent No.: US 9,586,609 B2
(45) Date of Patent: Mar. 7, 2017

(54) STEERING COLUMN OF A VEHICLE

(71) Applicant: Bayerische Motoren Werke Aktiengesellschaft, Munich (DE)

(72) Inventors: Martin Linke, Munich (DE); Matthias Schoelzel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/615,630

(22) Filed: Feb. 6, 2015

(65) Prior Publication Data
US 2015/0217796 A1    Aug. 6, 2015

Related U.S. Application Data

(63) Continuation of application No. PCT/EP2013/065770, filed on Jul. 25, 2013.

(30) Foreign Application Priority Data

Aug. 8, 2012 (DE) ........................ 10 2012 214 073

(51) Int. Cl.
*B62D 1/16* (2006.01)
*F16D 3/78* (2006.01)

(52) U.S. Cl.
CPC ............... *B62D 1/163* (2013.01); *B62D 1/16* (2013.01); *F16D 3/78* (2013.01)

(58) Field of Classification Search
CPC . B62D 1/16; B62D 1/163; B62D 1/18; B62D 1/19; B62D 1/20; B62D 7/224; F16D 3/10; F16D 3/12; F16D 3/50; F16D 3/76; F16D 3/78; F16D 2250/0084; F16D 2300/22; F16D 3/72; F16D 3/74
USPC ................................ 464/89, 92–96, 127, 180
See application file for complete search history.

(56) References Cited

U.S. PATENT DOCUMENTS

| | | | | |
|---|---|---|---|---|
| 1,188,113 A * | 6/1916 | Thomas | ................... | F16D 3/56 464/147 |
| 1,402,688 A * | 1/1922 | Travis | ....................... | F16D 3/78 464/93 |
| 1,626,195 A * | 4/1927 | Hiller | ....................... | F16D 3/78 464/95 |
| 2,499,093 A * | 2/1950 | Fast | ......................... | F16D 3/78 464/94 |
| 2,846,857 A * | 8/1958 | Hagenlocher | ............. | F16D 3/78 464/93 |

(Continued)

FOREIGN PATENT DOCUMENTS

EP       1 080 316 B1     8/2002
JP       63-101523 A      5/1988

OTHER PUBLICATIONS

"Vibration Isolation Rubber." Yamauchi Corp. Jan. 18, 2012, [online], [retrieved on Aug. 20, 2015] Retrieved from the Internet <URL: https://web.archive.org/web/20120118101241/http://www.yamauchi.co.jp/english/product_information/av_equipment/vibration_isolation_rubber.php>.*

(Continued)

*Primary Examiner* — Josh Skroupa
(74) *Attorney, Agent, or Firm* — Crowell & Moring LLP

(57) ABSTRACT

A vehicle steering column includes first and second shaft parts respectively coupled to an intermediate piece via first and second joint disks. The joint disks are configured such that when the steering column is in an uninstalled state, the first and second shafts are substantially coaxial, and when the steering column is in an installed state, the first and second shafts form a non-zero inclination angle via elastic deformation at the joint disks.

9 Claims, 3 Drawing Sheets

(56) References Cited

U.S. PATENT DOCUMENTS

| | | | | |
|---|---|---|---|---|
| 3,360,963 A * | 1/1968 | Turunen | ................... | F16D 3/78 464/94 |
| 7,445,242 B2 * | 11/2008 | Yamaguchi | .............. | B62D 1/16 464/180 |
| 2010/0120544 A1 * | 5/2010 | Mehlan | .................... | F16D 3/58 464/90 |

OTHER PUBLICATIONS

"Shaft." Merriam-Webster. [online], [retrieved on Jan. 21, 2016]. Retrieved from the Internet <URL: http://www.merriam-webster.com/dictionary/shaft>.*

German Search Report dated Jan. 24, 2013 with partial English-language translation (Ten (10) pages).

International Search Report (PCT/ISA/210) dated Nov. 11, 2013 with English-language translation (Four (4) pages).

* cited by examiner

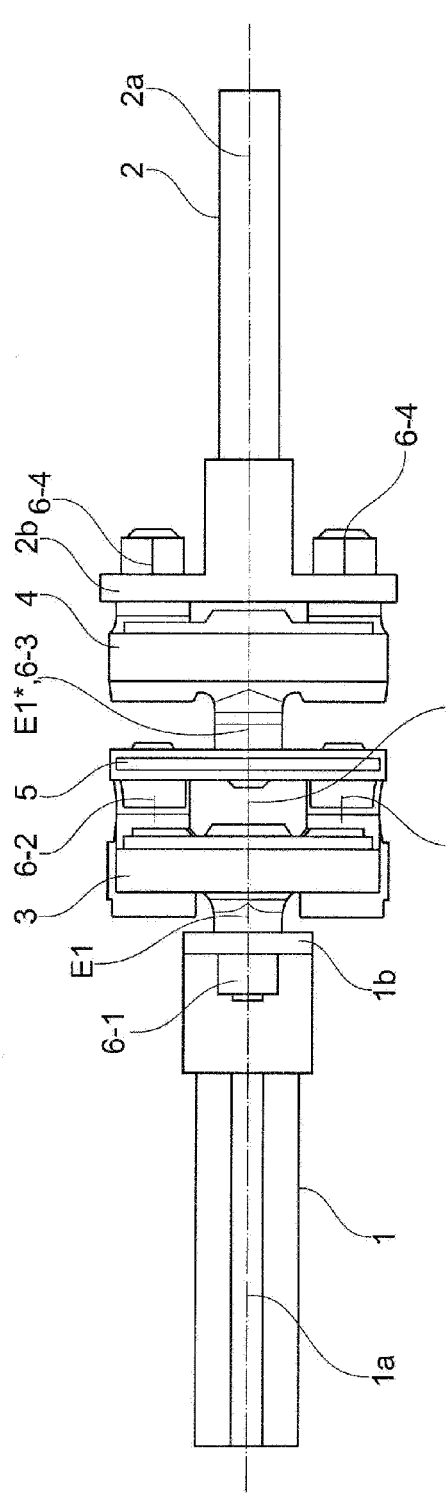
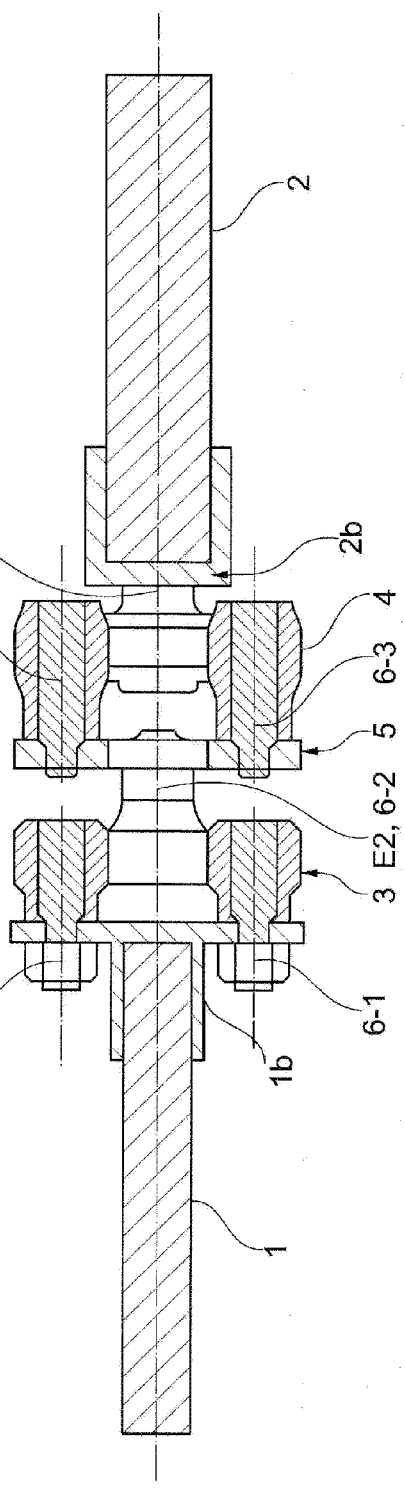

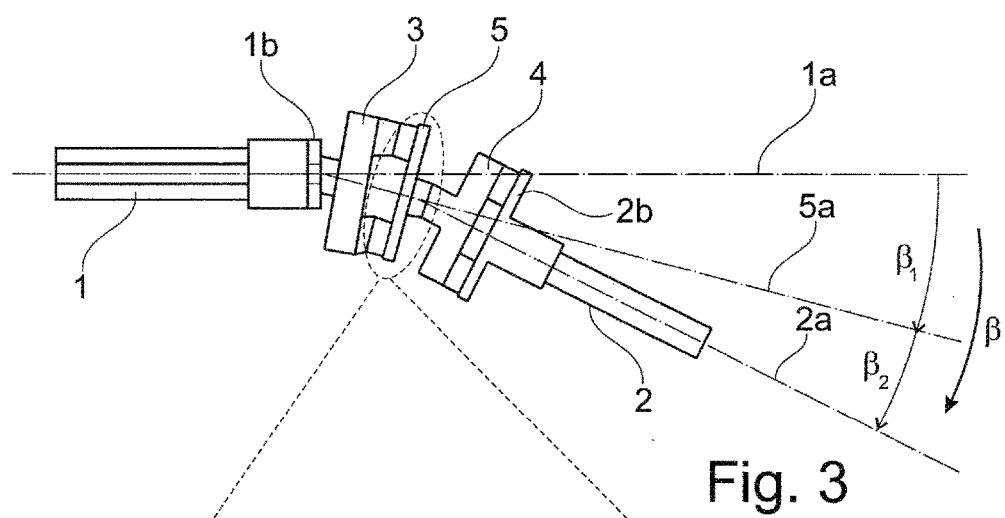
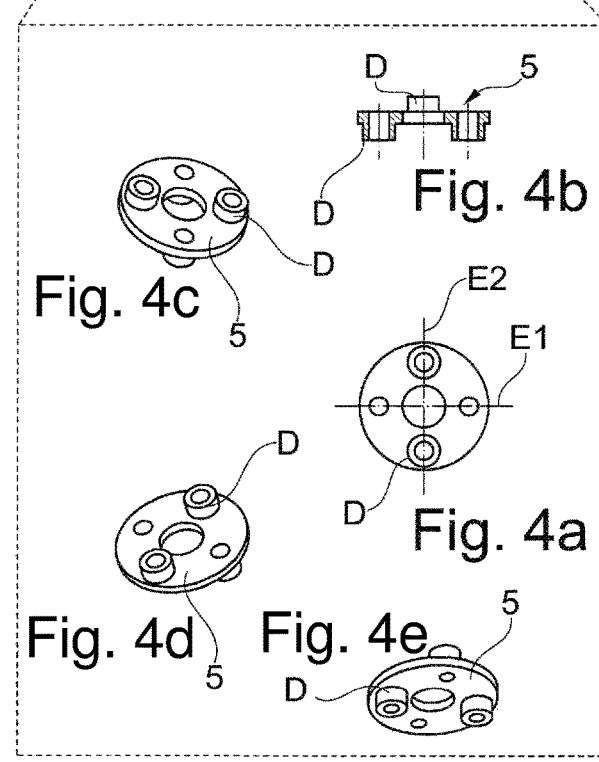

STEERING COLUMN OF A VEHICLE

CROSS REFERENCE TO RELATED APPLICATIONS

This application is a continuation of PCT International Application No. PCT/EP2013/065770, filed Jul. 25, 2013, which claims priority under 35 U.S.C. §119 from German Patent Application No. 10 2012 214 073.5, filed Aug. 8, 2012, the entire disclosures of which are herein expressly incorporated by reference.

BACKGROUND AND SUMMARY OF THE INVENTION

The present invention relates to a steering column of a vehicle having a first and second shaft part which are connected together via a universal-joint-type joint arrangement, which has a first and a second rubber-elastic joint disc, in a manner arranged coaxially with one another in succession as seen in the axial direction and without elastic deformation of the joint discs (within the scope of conventional tolerances). Concerning the state of the art, reference is made to European Patent Document EP 1 080 316 B1.

Elastic joint disks—often also called Hardy disks—are provided in shaft connections for the compensation of tolerances, particularly also with respect to an angle between the longitudinal axes of the shafts to be mutually connected, as well as also for the damping of vibrations of any type, in which case such joint disks may also be used for a decoupling of the two shafts with respect to an undesired vibration transmission.

This explanation basically also applies to the arrangement of elastic joint disks in steering columns of motor vehicles, where, usually by means of a universal joint, two shaft parts are mutually connected—for installation reasons, in the engine compartment of a motor vehicle at an inclination angle—, specifically a first shaft part connected with the driver's steering wheel and a second shaft part connected to a steering gear, from which steering gear, so-called steering tie rods lead to the steerable wheels of the vehicle.

One example of an elastic shaft coupling in a steering column of a motor vehicle is illustrated in the above-mentioned European Patent Document EP 1 080 316 B1, wherein not only one but two elastic joint disks are provided, viewed in the steering column axis direction, arranged quasi behind one another. In this case, these joint disks are arranged inside fittings, which are components of a first or second shaft part—according to the terminology of the present application/invention. The two fittings axially engage in one another with play. The play is dimensioned such that the fittings can be tilted with respect to one another to a limited extent. This should have the purpose of the above-mentioned compensation of tolerances.

By means of the present invention, it was recognized that, while using two elastic joint disks, which are arranged quasi behind one another, in a vehicle steering column but which are installed differently than in the cited prior art, an extremely advantageous additional function can be illustrated that is not shown in this prior art. It is therefore an object of the present invention to provide an advantageous further development of the state of the art.

For a steering column of the type described above, this and other objects are achieved in that an intermediate piece is provided between the two joint disks which is independent of the two shaft parts with respect to its mobility and is connected with the shaft parts by way of the joint disks in the manner of a universal joint such that, in the installed condition of the steering column, in a suitable lateral view, as a result of an elastic deformation of the two joint disks, the axes of rotation of the two shaft parts enclose or form an inclination angle of the steering column.

According to the invention, a universal joint is created by way of two elastic joint disks and an intermediate piece situated in-between. The intermediate piece is connected with the two shaft parts by way of these joint disks toward both sides in each case in a manner of a universal joint, which universal joint simultaneously comprises a vibration-related decoupling function, specifically by way of the elastic joint disks. Simultaneously with the interaction with the single intermediate piece, while elastically deforming, these elastic joint disks form a universal joint, so that pivot bearings or the like otherwise required for typical universal joints will no longer be necessary. It is only required to connect each elastic joint disk, on one side, with its assigned shaft part and, on the other side, in a universal-joint-type manner with the intermediate piece arranged between the two joint disks, whereupon the intermediate piece, while the respective joint disk is elastically deformed, can be moved with respect to the shaft part arranged on the other side of this joint disk, within the scope of the deformation possibility of the respective joint disk.

A universal-joint-type connection between two shafts or the like or, in the present case, by way of a first elastically deformable joint disk, between a first shaft part and the intermediate piece according to the invention or, adjoining the latter, between the intermediate piece by way of the second rubber-elastic joint disk and the/a second shaft part, as known, is characterized in that, in the unbent condition, viewed in the axis direction of one of the shaft parts, in a first plane, which is, for example, horizontal in a certain angle-of-rotation position of the shaft connection, on both sides of the (first) axis of rotation of the shaft and, in this case, slightly spaced away from the latter, a first connection exists (in the present case, between the shaft part and the joint disk), and in that, in a second plane, which is vertical in the example and is generally perpendicular with respect to the first plane, also on both sides of the axis of rotation of the shaft and, in this case, slightly spaced away from the latter, a second connection exists, in the present case, between the joint disk and the intermediate piece according to the invention. Viewed perpendicularly with respect to the quasi common axis of rotation of the shaft, the above-mentioned first connection and the above-mentioned second connection may be situated in a common plane, which, however, is not absolutely necessary. On the contrary, the above-mentioned connections, each viewed perpendicularly with respect to the axis of rotation of the shaft connection, may also be situated in mutually spaced planes, i.e. be arranged behind one another in the rotational axis direction.

In the case of a steering column according to the invention, two so-called "quasi universal joints" are now provided, which are formed by the two rubber-elastic joint disks and are arranged behind one another viewed in the axis direction of the steering column. Specifically, a first "quasi universal joint" is between the first shaft part and the intermediate piece according to the invention, and a second "quasi universal joint" is between the intermediate piece and the second shaft part. For reasons of completeness, it should explicitly be mentioned that, by means of such "quasi universal joints" or such universal-joint-type connections, not only the intermediate piece according to the invention can be moved with respect to the two shaft parts (within the scope of the deformation possibilities of the joint disks) but that, as a result, a mobility of each joint disk limited by the deformation possibilities of the joint disks also exists with respect to the shaft part assigned to it (by way of the universal-joint-type fastening) as well as with respect to the intermediate piece.

A universal-joint-type connection is also contained in the above-mentioned state of the art, but there no intermediate piece is provided between the two shaft parts, which is separated from the latter, or which, within the deformation possibilities of the joint disks, can be moved independently of the shaft parts.

Therefore, while, by means of a steering column according to the invention, in its installed condition in a motor vehicle, an inclination angle of significant magnitude can be illustrated between the two shaft parts, this is not possible in the case of the above-mentioned state of the art. Because of the above-mentioned slight play between the shaft parts mutually engaging in the connection area (there, the so-called "tube pieces"), at best, a slight compensation of tolerances is possible there, but no inclination angle of significant magnitude can be achieved.

In contrast, by means of the present invention, as a result of the two joint disks, which each form a "quasi universal joint", while the dimensions are conventional, an inclination angle of a magnitude of 20° can be achieved, which is composed of partial inclination angles of approximately 10° respectively in each "quasi universal joint". Partial inclination angles of this magnitude can be particularly easily shown by means of joint disks essentially conventionally dimensioned for steering columns if the first connections between the joint disk and the respective shaft part, on the one hand, and the second connections between the joint disk and the intermediate piece according to the invention, on the other hand, on different sides of a joint disk and therefore viewed in the axis direction of the steering column or rotational axis direction of the respective shaft part, are spaced away from one another , i.e. provided quasi behind one another.

The arrangement of the two joint disks and of the intermediate piece, which can be moved independently of the shaft parts (within the scope of the deformation possibilities of the joint disks), is specifically such that, viewed in the axis direction of the steering column not installed in the vehicle and therefore without any elastic deformation of the joint disks, the connection between the first shaft part and the first joint disk is established by two connection elements provided in a first plane containing the axis of rotation of the first shaft part on both sides of this axis of rotation. These connection elements preferably extend in the rotational axis direction. The connection between the first joint disk and the intermediate piece is established by two connection elements provided in a second plane perpendicular to the first plane and also containing the rotational axis of the first shaft part, on both sides of this axis of rotation. These connection elements preferably (also) extend in the rotational axis direction. Analogously, the connection between the intermediate piece and the second joint disk can be established by two connection elements provided in a third plane containing the axis of rotation of the second shaft part on both sides of the axis of rotation of the second shaft part. These connection elements preferably extend in the rotational-axis direction of the second shaft part. The connection between the second joint disk and the second shaft part can be established by two connection elements provided in a fourth plane perpendicular with respect to the third plane and containing the axis of rotation of the second shaft part, on both sides of this axis of rotation. These connection elements preferably also extend in the rotational-axis direction.

It becomes clear from this representation that, in the condition in which it is not installed in the vehicle, the steering column does not have any significant inclination angle. The two shaft parts are therefore situated at least coaxially with respect to one another, and the inclination angle occurs only at the steering column installed in the vehicle while the rubber-elastic joint disks are elastically deformed. In this case, the corresponding deformations of each individual joint disk in the form of partial inclination angles add up to a total inclination angle of greater magnitude of the steering column according to the invention. The maximum of the total inclination angle is achieved when, if the steering column is not installed in the vehicle, the first plane mentioned in the preceding paragraph and the third plane mentioned there essentially coincide, i.e. within the scope of conventional tolerances, and the second and the fourth plane essentially coincide, i.e. within the scope of conventional tolerances.

In order to be able to provide the individual above-mentioned partial inclination angles between each joint disk or the assigned shaft part and the intermediate piece according the invention in a collision-free manner, recesses or spacer elements may be provided in or at the intermediate piece but also, or as an alternative, at the joint disks and the shaft parts. Spacer elements (also conceivable in a component-integrated fashion) hold the concerned components sufficiently far apart, while recesses directly avoid a collision.

A particularly advantageous further development of the invention is such that the two joint disks have different designs. With respect to a vibration-related and particularly acoustic decoupling of the two shaft parts from one another, they are or may be designed for different operating ranges and particularly different frequencies or frequency bands. As known, rubber-elastic vibration decoupling elements can be designed for a particularly high effectiveness in a defined frequency band, which can take place, for example, by a suitable selection of material, hardness, forming and more. Because, in the present case, at least two each of such rubber-elastic joint disks are provided, it becomes possible to design the latter in different frequency ranges with respect to a particularly effective decoupling, so that, as a whole, a steering column according to the invention may be designed to be decoupled from vibrations with respect to a particularly broad frequency band, in that the two joint-disk-individual frequency bands are quasi added to one another.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a lateral view of the essential section of a steering column when the latter is not installed in the vehicle;

FIG. 2 is a sectional view of this section in a position rotated by 90° about the longitudinal axis of this section;

FIG. 3 is a view of this section as installed in the vehicle;

FIGS. 4A-4e are different views of an intermediate piece according to the invention;

DETAILED DESCRIPTION OF THE DRAWINGS

Figure 6:
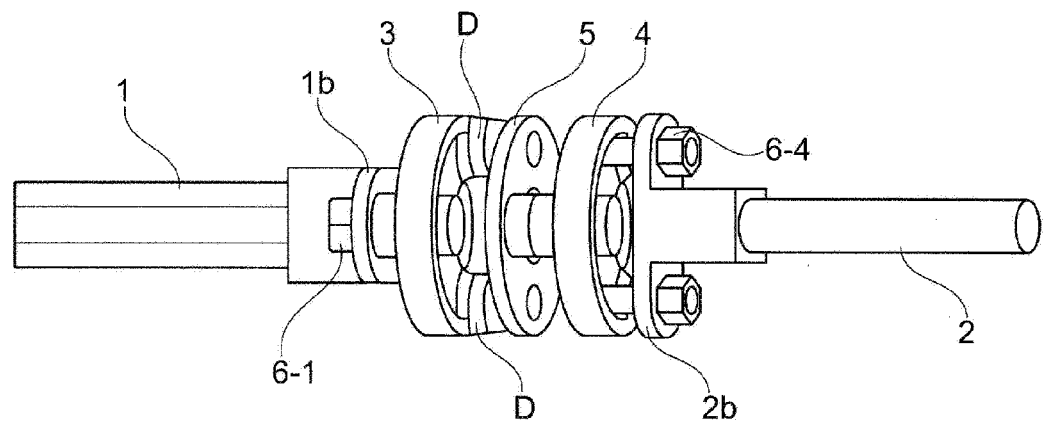
FIGS. 5 and 6 are additional views of the steering column, not installed in the vehicle, at different angles of rotation about the longitudinal axis of this section, FIG. 6 being a slightly perspective view.

Reference number 1 indicates a first shaft part of a steering column of a motor vehicle, and reference number 2 indicates a second shaft part of this steering column, of which only that area or section is illustrated in which these two shaft parts 1, 2 are connected with one another in a manner arranged behind one another (in succession), viewed in the direction of their axis of rotation. This shaft connection has a universal-joint-type design and consists of two rubber-elastic joint disks 3, 4 and an intermediate piece 5 arranged between these joint disks 3, 4, as well as several connection elements 6-x (with x=1, 2, 3, 4) illustrated in a simplified manner between the above-mentioned components. These connection elements 6-x may, for example, be constructed as threaded bolts with nuts mounted on the end side and extend predominantly at least approximately in the axis direction of the steering column; however, any other type of a suitable conventional connection element may be used.

FIGS. 1, 2, illustrate the indicated section of the steering column in a condition in which it is not installed in the vehicle and in which the axes of rotation 1a, 2a of the two shaft parts coincide and thereby form the above-mentioned longitudinal axis of this section and the axis of the steering column. A connection flange 1b, 2b is visible in the connection area of the two shaft parts 1, 2 at the quasi free end of each shaft part 1, 2. Viewed in the axis direction of the steering column, the connection between the first shaft part 1 and the adjoining first joint disk 3 is established by two connection elements 6-1 (see FIG. 2) provided in a first plane E1, which contains the axis of rotation 1a of the first shaft part 1a and extends perpendicularly to the plane of the drawing in the angle of rotation position of the steering column illustrated in FIG. 1. The first plane E1 is situated in the plane of the drawing in the angle of rotation position of the steering column illustrated in FIG. 2. On both sides of this axis of rotation 1a, the connection elements 6-1 extend in the direction of the axis of rotation 1a.

On the other (here, right) side of this joint disk 3 assigned to the first shaft part 1, the connection between this first joint disk 3 and the intermediate piece 5 is established by two connection elements 6-2 (see FIG. 1) provided in a second plane E2 perpendicular to the first plane E1 and containing the axis of rotation 1a of the first shaft part 1. The two connection elements are arranged on both sides of the axis of rotation 1a, and extend approximately in the direction of the axis of rotation 1a. In FIG. 1, this plane E2 perpendicular to the plane E1, with the angle of rotation position of the steering column illustrated there, is situated in the plane of the drawing, and in FIG. 2, with the angle of rotation position of the steering column illustrated there, extends perpendicularly with respect to the plane of the drawing.

In the uninstalled condition of the steering column according to FIGS. 1, 2, an axis of rotation 5a of the intermediate piece 5 can be defined as a connection line between the axis of rotation 1a of the first shaft part 1 and the axis of rotation 2a of the second shaft part 2. In the installed condition of the steering column in the vehicle according to FIG. 3, this axis of rotation 5a of the intermediate piece 5 together with the axis of rotation 1a of the first shaft part 1 encloses a partial inclination angle β1 (of a magnitude of 10°) which is the result of a corresponding installation of the two shaft parts 1, 2 in the vehicle and an ensuing elastic deformation of the first joint disk 3.

Referring back to FIGS. 1, 2, a connection is established between the intermediate piece 5 and the second joint disk 4 adjoining the intermediate piece 5 in the direction of the second shaft part 2 by way of two connection elements 6-3 provided in a first plane containing the axis of rotation 5a of the intermediate piece 5 and, in the uninstalled condition in the vehicle, in a third plane E1* containing the axis of rotation 2a of the second shaft part 2a, on both sides of this axis of rotation 2a. These connection elements 6-3 extend in the direction of the axis of rotation 5a and at least approximately in the direction of the axis of rotation 2a. In the uninstalled condition of the steering column in the vehicle according to FIGS. 1, 2, the third plane E1* coincides with the first plane E1 within the scope of conventional tolerances, so that, in FIG. 1, this third plane extends perpendicularly to the plane of the drawing, and is situated in the plane of the drawing in FIG. 2.

On the other side of this joint disk 4 assigned to the second shaft part 2, the connection between this second joint disk 4 and the second shaft part 2 is established by two connection elements 6-4 extending in a fourth plane E2* perpendicular to the third plane E1* and containing the axis of rotation 2a of the second shaft part 2 provided on both sides of this axis of rotation 2a and in the direction of the axis of rotation 2a. In FIG. 1, the plane E2* perpendicular to the plane E1* with the angle of rotation position of this steering column section illustrated in FIG. 1 is situated in the plane of the drawing and, in FIG. 2, extends with the angle of rotation position of this steering column section illustrated in FIG. 2 perpendicularly to the plane of the drawing. In addition, in the condition of the steering column not installed in the vehicle according to FIGS. 1, 2, the fourth plane E2* coincides with the second plane E2 within the scope of conventional tolerances.

FIG. 3 illustrates the steering column in the installed condition in the vehicle with an elastic deformation of the two joint disks 3, 4. The axes of rotation 1a, 2a of the two shaft parts 1, 2 lead into one another at least within conventional tolerances; i.e. in the not installed condition, the two shaft parts 1,2 are coaxially situated behind one another, as illustrated in FIGS. 1, 2, 5 and 6. However, the situation is different in the installed condition of the steering column in the vehicle, as illustrated in FIG. 3. An inclination angle β of a magnitude of 20° exists here between the two shaft parts 1, 2, which inclination angle β is the result of the above-mentioned partial inclination angle β1 between the axis of rotation 1a of the first shaft part 1 and the axis of rotation 5a of the intermediate piece, as well as a further partial inclination angle β2. Specifically, in the installed condition of the steering column in the vehicle according to FIG. 3, the axis of rotation 5a of the intermediate piece 5 together with the axis of rotation 2a of the second shaft part 2 enclose a partial inclination angle β2 (of a magnitude of 10°), which is also a result of the corresponding installation of the two shaft parts 1, 2 in the vehicle and of a resulting elastic deformation also of the second joint disk 4. The two partial inclination angles β1 and β2 add up to form the above-mentioned greater (total) inclination angle β of the steering column.

FIGS. 4a and 4e (quasi, in an enlarged detail of FIG. 3) illustrate the intermediate piece 5 in different views. FIG. 4A is a top view, in which the two above-mentioned planes E1, E2 are illustrated perpendicularly with respect to one another. FIG. 4B is a sectional view of the intermediate piece in plane E1. So-called spacer elements D provided on the surface of the otherwise disk-shaped intermediate piece 5 are also visible in the representations of FIGS. 4a-4e, which spacer elements D are component-integrated in the present case and allow in a collision-free manner the above-mentioned partial inclination angles β1, β2 between the concerned, mutually adjacent components.

Figure 5:
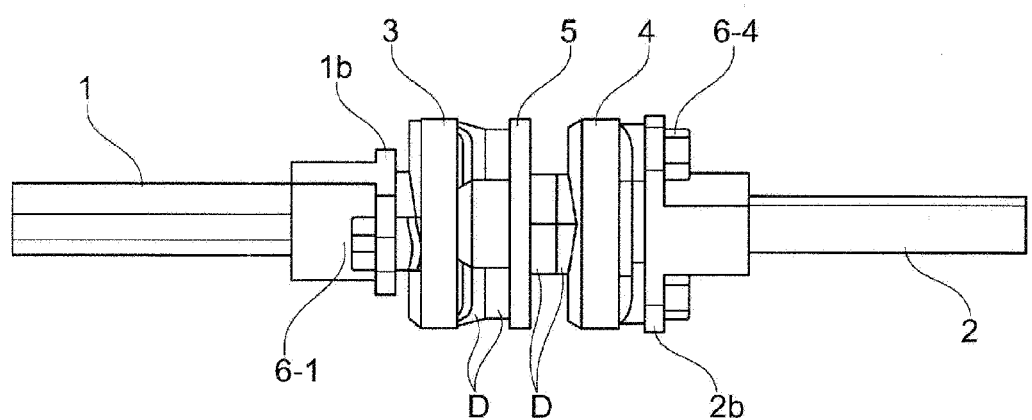

In the present case, such spacer elements D may also be provided in the joint disks 3, 4 at least on their side facing the intermediate piece 5, in a manner integrated in the component; compare the corresponding reference number in FIGS. 5 and 6, in which, for reasons of clarity, only a few reference numbers are shown. As an alternative, such spacer elements D may also be formed by independent separate components. In addition, a plurality of further modifications of above implementations or of the illustrated embodiment are contemplated. In particular, adjoining such a pair of rubber-elastic joint disks 3, 4 with an intermediate piece 5 situated in-between, a further intermediate piece and adjoining the latter, a further rubber-elastic joint disk can be provided in a steering column in an analogously arranged and acting manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle steering column, comprising:
    first and second shaft parts;
    a joint arrangement comprising first and second rubber-elastic joint disks, the joint arrangement mutually connecting the first and second shaft parts coaxially with respect to one another in succession; and
    an intermediate piece arranged between the first and second joint disks and connecting the first and second shaft parts via the first and second joint disks, respectively,
    wherein the intermediate piece is independent of the first and second shaft parts with respect to its mobility,
    wherein the joint arrangement is configured such that, when the vehicle steering column is in an uninstalled state, the first and second shaft parts are substantially coaxial, and
    wherein the joint arrangement is configured such that, when the vehicle steering column is in an installed state, the first and second shaft parts form a non-zero inclination angle via elastic deformation at the first and second joint disks;
    wherein each shaft is coupled to one of the joint disks and each joint disk is coupled to the intermediate piece, via connection elements that project into and directly contact the respective joint disks.

2. The vehicle steering column according to claim 1, wherein the steering column in an uninstalled state without any elastic deformation of the first and second joint disks, the joint arrangement comprises:
    first and second connection elements establishing a connection between the first shaft part and the first joint disk, the first and second connection elements being arranged in a first plane containing the axis of rotation of the first shaft part, one connection element being arranged on each side of the axis of rotation of the first shaft part,
    third and fourth connection elements establishing a connection between the first joint disk and the intermediate piece, the third and fourth connection elements being arranged in a second plane perpendicular to the first plane and containing the axis of rotation of the first shaft part, one connection element being arranged on each side of the axis of rotation of the first shaft part,
    fifth and sixth connection elements establishing a connection between the intermediate piece and the second joint disk, the fifth and sixth connection elements being arranged in a third plane containing the axis of rotation of the second shaft part, one connection element being arranged on each side of the axis of rotation of the second shaft part, and
    seventh and eighth connection elements establishing a connection between the second joint disk and the second shaft part, the seventh and eighth connection elements being arranged in a fourth plane perpendicular to the third plane and containing the axis of rotation of the second shaft part, one connection element being arranged on each side of the axis of rotation of the second shaft part.

3. The vehicle steering column according to claim 2, wherein, in the uninstalled state of the steering column, the first plane and the third plane essentially coincide and the second plane and the fourth plane essentially coincide.

4. The vehicle steering column according to claim 2, further comprising:
    recesses or spacer elements provided in or at the intermediate piece and/or at the first and second joint disks, wherein the recesses or spacer elements are configured to permit the inclination angle of the steering column without any collision between the first and second joint disks and the intermediate piece or between the first and second joint disks and the respectively associated first and second shaft parts.

5. The vehicle steering column according to claim 2, wherein the first and second joint disks are configured differently from one another to provide different operating ranges.

6. The vehicle steering column according to claim 5, wherein the different operating ranges are different frequencies with respect to acoustic decoupling.

7. The vehicle steering column according to claim 1, further comprising:
    recesses or spacer elements provided in or at the intermediate piece and/or at the first and second joint disks, wherein the recesses or spacer elements are configured to permit the inclination angle of the steering column without any collision between the first and second joint disks and the intermediate piece or between the first and second joint disks and the respectively associated first and second shaft parts.

8. The vehicle steering column according to claim 1, wherein the first and second joint disks are configured differently from one another to provide different operating ranges.

9. The vehicle steering column according to claim 8, wherein the different operating ranges are different frequencies with respect to acoustic decoupling.

* * * * *